United States Patent [19]

Baversten

[11] Patent Number: 5,570,402
[45] Date of Patent: Oct. 29, 1996

[54] CONTROL ROD HOUSING SUPPORT SYSTEM WITH RADIATION SHIELD RINGS

[75] Inventor: Bengt I. Baversten, Västerås, Sweden

[73] Assignee: Combustion Engineering, Inc., Windsor, Conn.

[21] Appl. No.: 285,739

[22] Filed: Aug. 4, 1994

[51] Int. Cl.⁶ .................................................. G21C 11/00
[52] U.S. Cl. ............................ 376/287; 376/260; 376/285
[58] Field of Search ...................................... 376/219, 260, 376/287, 285, 461, 288

[56] References Cited

U.S. PATENT DOCUMENTS

| 4,278,498 | 7/1981 | Uhlmann et al. | 176/36 R |
|---|---|---|---|
| 4,481,164 | 11/1984 | Bollinger | 376/233 |
| 4,699,752 | 10/1987 | Brahm et al. | 376/260 |
| 4,752,434 | 6/1988 | Savary | 376/233 |
| 4,820,058 | 4/1989 | Wilson et al. | 376/327 |
| 4,859,409 | 8/1989 | Matusz et al. | 376/463 |
| 4,865,801 | 9/1989 | Brahm et al. | 376/260 |
| 4,888,149 | 12/1989 | Bryan | 376/287 |
| 5,321,732 | 6/1994 | Baversten | 376/463 |
| 5,323,435 | 6/1994 | Baversten | 376/463 |

FOREIGN PATENT DOCUMENTS

| 1271594 | 4/1972 | United Kingdom. | |
| 2161014 | 1/1986 | United Kingdom | 376/285 |

Primary Examiner—Charles T. Jordan
Assistant Examiner—Chrisman D. Carroll
Attorney, Agent, or Firm—Ronald P. Kananen; John H. Mulholland

[57] ABSTRACT

A boiling water reactor control rod drive support system having radiation shields to protect persons working under the reactor vessel from radiation exposure and to limit the travel of a control rod in the event that a control rod housing is ruptured. The radiation shields include radiation shield rings for surrounding the control rod drive housing and radiation shield cups for surrounding the bottom portion of the control rod drive. The radiation shield rings can be used with support systems having radiation shield cups placed on rows of support bars or with existing support systems.

23 Claims, 5 Drawing Sheets

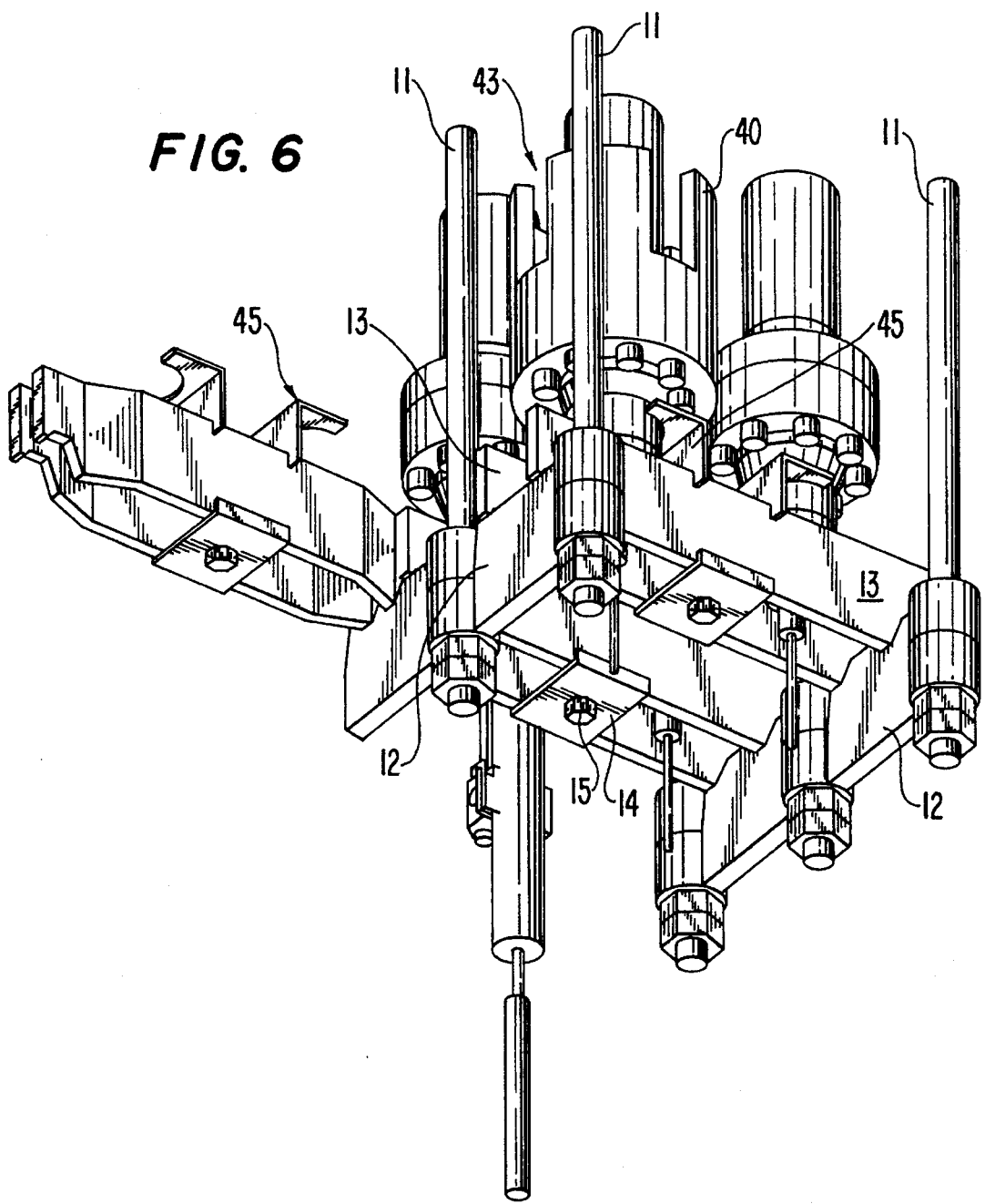

5,570,402

CONTROL ROD HOUSING SUPPORT SYSTEM WITH RADIATION SHIELD RINGS

BACKGROUND OF INVENTION

1. Field of the Invention

This invention relates to supports and, more particularly, to boiling water reactor control rod drive housing supports. Still more particularly, this invention relates to control rod drive housing supports with radiation shields.

2. Description of Prior Art

In boiling water reactors the control rod drive housing supports are generally located underneath the reactor vessel near the control rod housings. The control rod drive housing supports limit the travel of and support a control rod in the event that a control rod drive housing is ruptured. The supports help prevent a loss of control as a result of a housing failure, thus protecting the fuel barrier.

Typically, control rod drive housing supports consist of hanger rods that are attached and supported at their upper end at a beam structure immediately underneath the reactor pressure vessel and support bars which are bolted between the hanger rods below the control rod drives. Another grid of bars is installed on the support bars to transfer the load of a ruptured control rod drive housing to the support bars. Generally, a pair of grid bars support each control rod drive. Each pair of grid bars are held together by two grid clamps and a bolt.

In this support system of the prior art, when it is necessary to change or replace a control rod drive, the grid bars must be removed. In order to remove the grid bars the operator must manually unscrew the grid clamp bolt, remove the two grid clamps and then remove the grid bars, each weighing approximately forty pounds. The number of grid bars which must be removed depends on the number of control rods which must be replaced. Furthermore, since the grid bars are interlocking, they must be removed starting from the outer peripheral row.

Thus, if a large number of control rod drives must be replaced or if an inner control rod drive must be replaced, a large number of grid bars must be removed. The result is a time consuming and cumbersome process. Moreover, as the grid bars are heavy and awkward to handle, a dropped bar could result in serious injury.

Further still, the persons handling the grid bars or working under the reactor pressure vessel are subject to substantial radiation doses. The more time a person must spend replacing the control rod drives, the more that person is subject to dangerous radiation doses.

Thus, there is a need in the art for an apparatus to reduce and minimize the radiation exposure of a person working under the reactor pressure vessel of a boiling water nuclear reactor.

SUMMARY OF THE INVENTION

It is an object of the present invention to provide radiation shields to minimize the amount of radiation a person is subject to when replacing a control rod drive or working under the reactor pressure vessel.

It is another object of the present invention to support a control rod drive housing in the event that a control rod housing is ruptured while allowing for quick and easy replacement of a control rod drive.

It is another object of the present invention to provide a control rod drive housing support which can be removed automatically.

Additional objects, advantages and novel features of the invention will be set forth in the description which follows, and will become apparent to those skilled in the art upon reading this description or practicing the invention. The objects and advantages of the invention may be realized and attained by the appended claims.

To achieve the foregoing and other objects, in accordance with the present invention, as embodied and broadly described herein, the control rod housing support system of this invention may comprise a first means for supporting a control rod drive in the case of a housing failure; a second means for supporting the control rod drive in the case of a housing failure and for shielding persons working under the reactor vessel from radiation, the second means being supported by the first supporting means, wherein the second means can be raised and lowered between a non-support position where the control rod drive is not supported and a support position where the control rod drive is supported; and a radiation shield means for shielding persons working under the reactor vessel from radiation, the shield means being provided about the control rod drive above the second supporting means.

The first supporting means may comprise a plurality of support members provided in rows on opposing sides of a lower portion of a plurality of control rod drives and the second supporting means may comprise a plurality of support cups, each of the support cups receiving, and shielding a lower portion of the control rod drive and supporting the control rod drive in the case of a housing failure.

Further, the radiation shield means may comprise a plurality of shield rings, each of the shield rings being disposed about a control rod drive housing and including pin means for maintaining the shield rings in position about the control rod drives when the support cups are removed. The shield rings are supported on the support cups when the cups are in their installed position. The shield rings may also include slots for accommodating seismic restraints between adjacent control rod drives.

In accordance with a further aspect of the present invention, in accordance with its objects and purposes, the device hereof may also comprise a radiation shield apparatus for use in a nuclear reactor, comprising a cylindrical-shaped ring member having an inner diameter slightly larger than a control rod drive housing of the reactor, a lower abutment surface for engagement with a control rod drive support system, and a hanger means for supporting the ring member on a control rod drive when the lower abutment surface is not engaged by a support system.

BRIEF DESCRIPTION OF THE DRAWINGS

The accompanying drawings, which are incorporated in, and form a part of, the specification, illustrate an embodiment of the present invention and, together with the description, serve to explain the principles of the invention. In the drawings:

FIG. 6 is a perspective view of a radiation shield ring of the present invention used in conjunction with existing control rod drive housing support bars.

DETAILED DESCRIPTION OF THE PREFERRED EMBODIMENT

Reference will now be made in detail to the preferred embodiment of the invention, an example of which is illustrated in the accompanying drawings.

Boiling water reactors use control rods in the reactor vessel for controlling the reaction therein. The control rods are generally contained in a grid-like fashion in a control rod housing with a drive unit for raising the control rods into the assembly of the fuel rods. Located underneath the reactor vessel near the control rod housings are control rod drive housing supports for limiting the travel of a control rod in the event that a control rod housing is ruptured.

Figure 1:
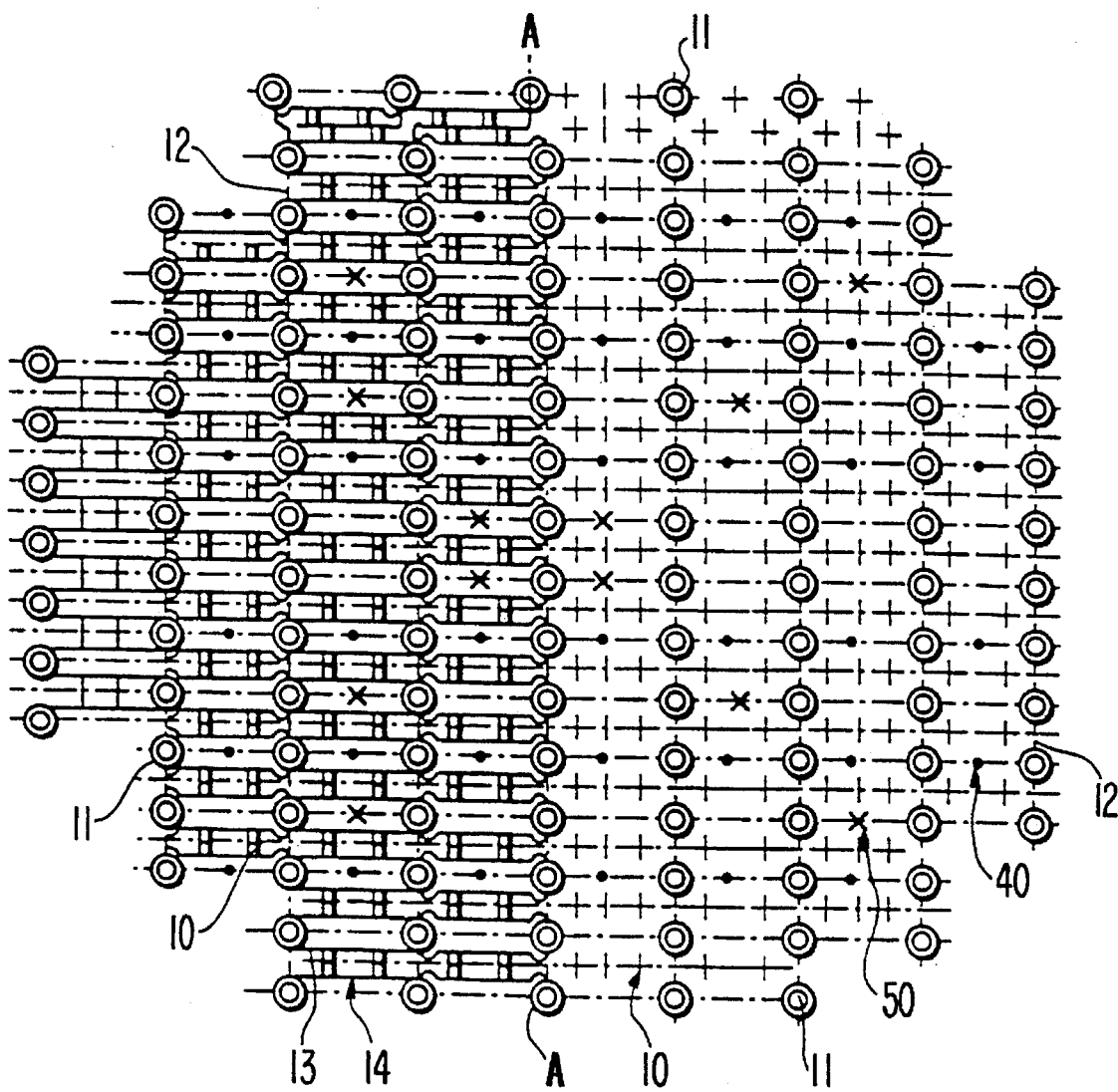
FIG. 1 is a top schematic view of the control rod drive housing support bars of the prior art.

A top view of the existing control rod drive housing supports is shown schematically in FIG. 1. A perspective view of the existing control rod drive housing supports in conjunction with a radiation shield ring of the present invention (which will be described later) is shown in FIG. 6. The positions shown at 10 correspond to a control rod drive position. The existing control rod drive housing supports consist of hanger rods 11 supported by a beam underneath the reactor pressure vessel (not shown) spaced throughout the grid of control rod drive positions. Support bars 12 are bolted between the hanger rods 11. Grid bars 13 are installed on the support bars 12 to support the control rod drive and transfer the load of the control rod drive to the support bars 12. Generally, a pair of grid bars 13 support each control rod drive. Each pair of grid bars 13 is held together by two grid clamps 14 and a bolt 15.

In FIG. 1, the control rod drive housing supports of the prior art are shown to the right of line A—A only with the support bars 12 and are shown with the support bars 12 and grid bars 13 to the left of the line A—A. In actual operation, the grid bars 13 would be used throughout the entire housing supports. In order to replace a control rod drive using these prior art control rod drive housing supports, the grid bars 13 and clamps 14 must be removed. Because the grid bars 13 are interlocking, they must be removed starting from the periphery, resulting in a cumbersome and time consuming process that increases the radiation dosage when servicing or replacing the control rod drives.

The above-mentioned disadvantages of the existing control rod drive systems have been substantially reduced with the structure disclosed in applicant's earlier filed, related U.S. Pat. Nos. 5,321,732 and 5,323,435. The disclosures of these related patents is expressly incorporated herein by reference. As will become clear from the discussion below, the improved control rod drive systems of these related patents are well-suited for use in conjunction with the radiation shield rings of the present invention.

Figure 2:
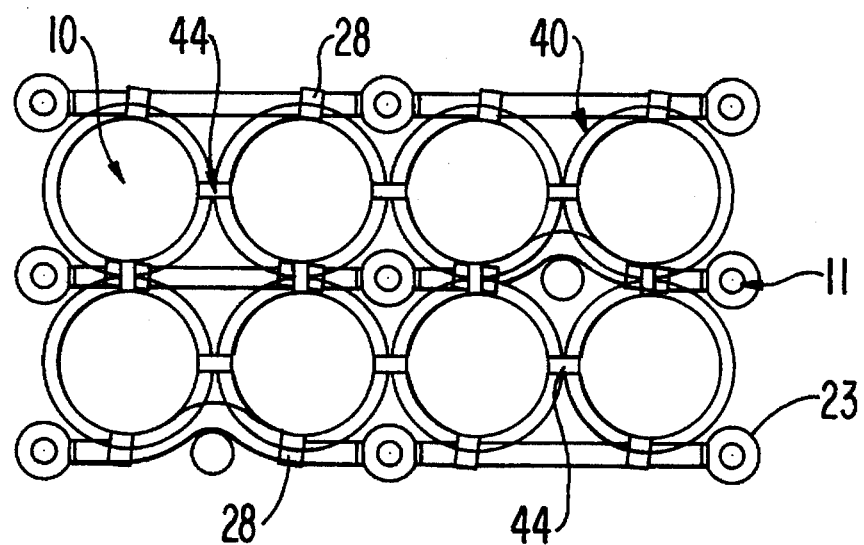
FIG. 2 is a top view of the control rod drive housing support bars with the radiation shield assemblies of the present invention.
Figure 3:
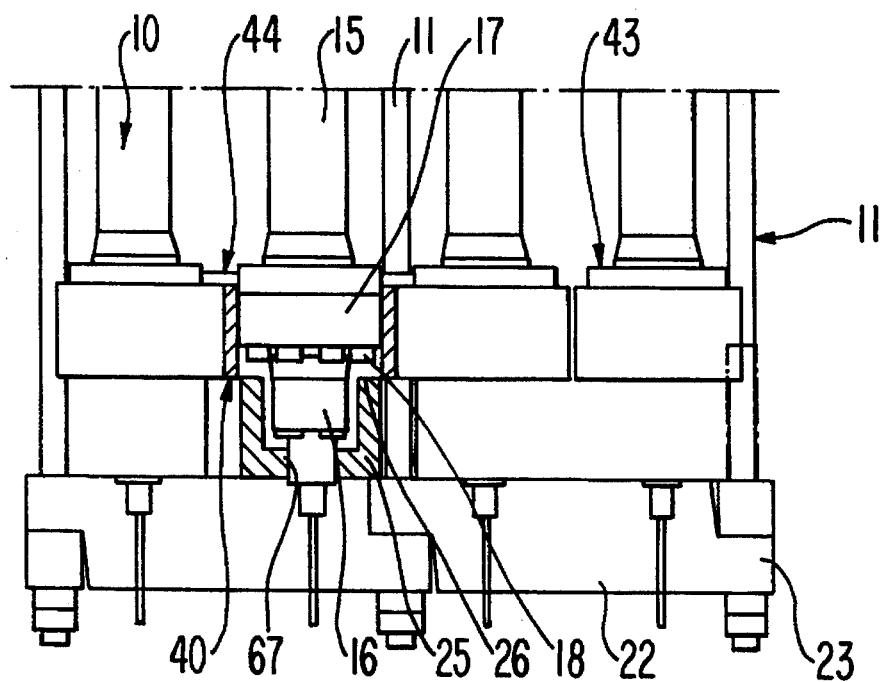
FIG. 3 is a side view of the control rod drive housing support bars with the radiation shield assemblies of the present invention.

With reference to FIGS. 2 and 3, the present invention will first be described in an embodiment having lower radiation shield cups, similar to the radiation shield cups disclosed in applicant's related U.S. Pat. No. 5,321,732.

First, the lower radiation shield cup support assemblies will be described, followed by a description of the radiation shield rings of the present invention.

In FIGS. 2 and 3, the control rod drive positions and hanger rods are again shown at 10 and 11, respectively. However, the grid bars 13 and clamps 14 of the prior art control rod support structure of FIGS. 1 and 6 are replaced with radiation shield cups 25. The radiation shield cups 25 both support the control rod drives in the case of control rod drive housing rupture and provide radiation protection for the personnel working under the reactor pressure vessel. Moreover, the design of the radiation shields 25 are such that they can be easily handled and removed by a control rod drive removal/installation machine. Thus, all awkward and dangerous, manual handling of the control rod drive and supports required with the grid bars of the prior art is eliminated making changing the control rod drives much easier and faster. Moreover, the radiation shields 25 help protect the personnel working under the reactor pressure vessel from exposure to radiation.

In the improved support structure, the support bars 12 of the prior art are replaced with support bars 22. The support bars 22 are placed in rows along opposing sides of the control rod drive positions and are oriented ninety degrees to the old support bars 12. An end of each support bar 22 is supported on a hanger rod 11 through a hub 23. The support bars 22 and hubs 23 may take many different forms depending on the particular application, as described in detail in applicant's U.S. Pat. Nos. 5,321,732 and 5,323,435, and incorporated herein by reference.

Typically, the support bars 12 of the prior art were one foot long. The length of support bars 22 of the present invention may vary depending on the reactor and the placement of the hangers. Preferably, the length of the support bars 22 is about two feet.

Figure 4:
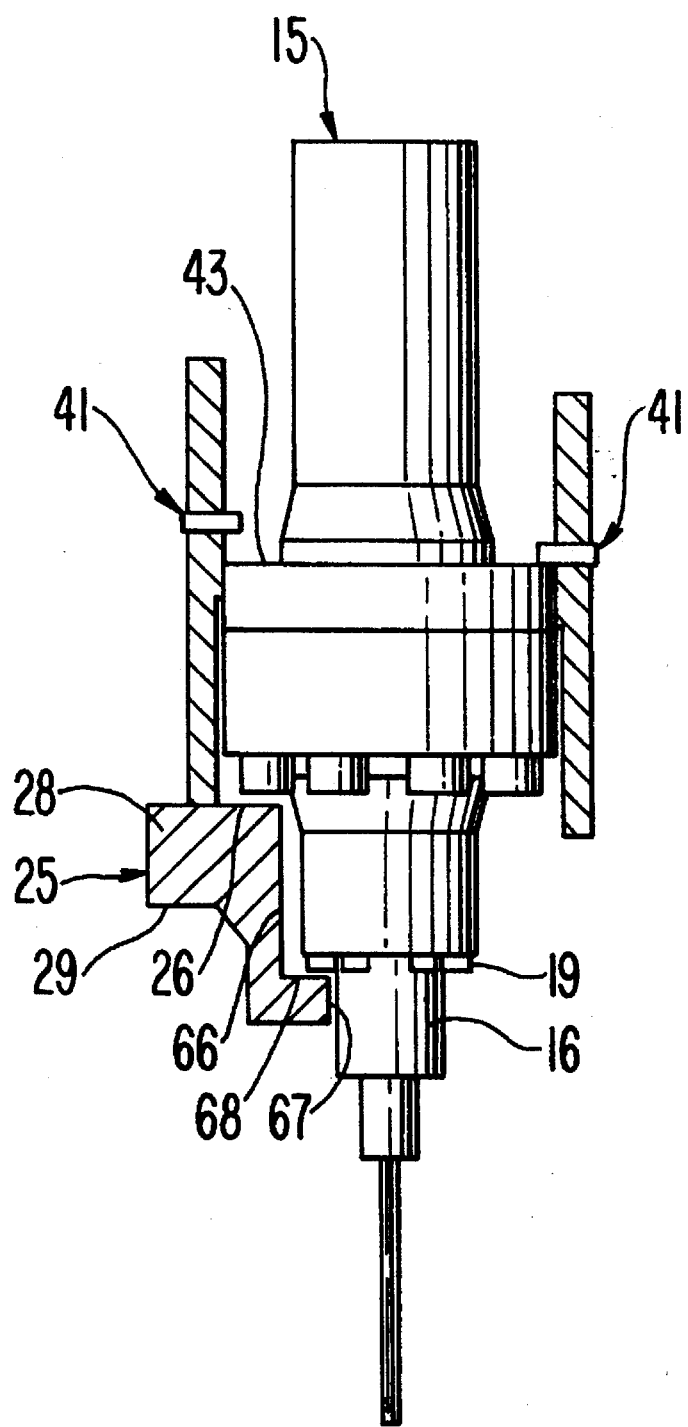
FIG. 4 is a side view showing a radiation shield ring of the present invention in a first position supported by a radiation shield cup and in a second position supported by the control rod drive housing.
Figure 5:
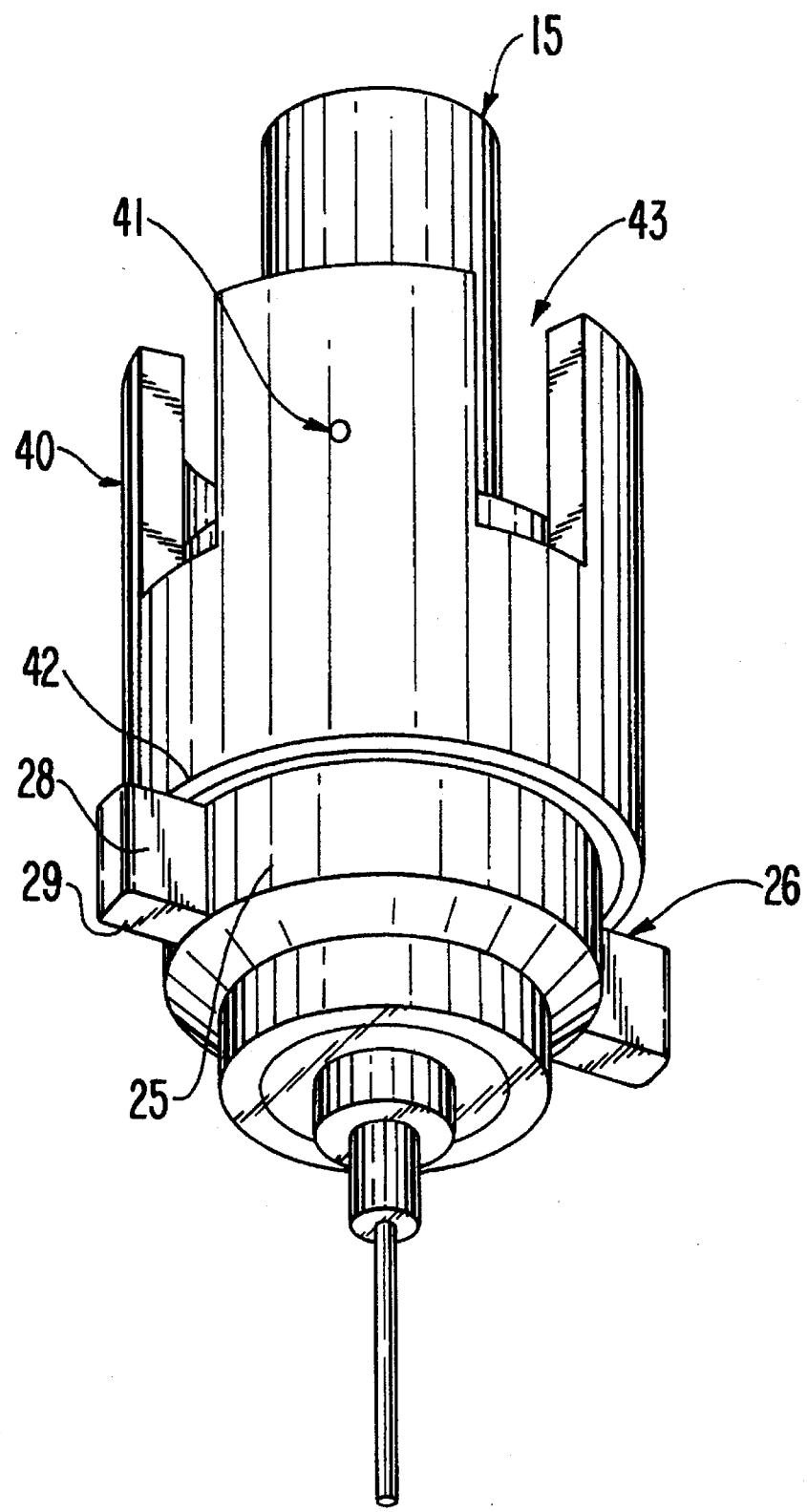
FIG. 5 is a perspective view of the control rod drive system having a radiation shield cup and a radiation shield ring.

As shown in FIGS. 2 and 3, the support assembly of the present invention is comprised of radiation shields 25 in the shape of cups interlocked together. The radiation shield cups 25 surround a bottom portion 16 of a control rod drive 15 beneath a flange 17 and flange bolts 18 on the control rod drive. The preferred form of the radiation shield cup 25 includes a first annular hole 66 and a second annular hole 67 (see the left half of FIG. 4). Between the first and second holes 66 and 67 is a ledge 68. In operation, the cup 25 may be provided around the bottom portion 16 of the control rod drive 15 with a clearance between the ledge 68 and a set of lower flange bolts 19. In the case of housing failure, the cups 25 can support the control rod drive through engagement with either the upper flange bolts 18 or the lower flange bolts 19.

The openings 67 in the cups 25 allow the passage of an electric cord of the control rod drive 15 and connection to a control rod drive control system (not shown). The radiation shield cups 25 are each provided with support tabs 28 on opposing sides with lower surfaces 29 for resting on the support bars 22 after installation. The support bars 22, in turn, are installed on the hanger rods 11 through hubs 23, as mentioned above.

Prior to operation of the reactor, the radiation shield 25 is lifted into position by a mast of the control rod drive removal/installation machine and, when at the appropriate height, it is turned 45° and locked in position on top of the support bars 22. When the radiation shield 25 is removed by the control rod drive removal/installation machine, it is turned 45° and unlocked and lowered to a position where it may easily be manually lifted and moved to the side. As a result, considerable time is saved and workers are subject to considerably less radiation compared to the handling of the grid bar supports of the prior art.

The radiation shield cups 25 are provided below the control rod drive flange bolts 18 and 19 with some clearance to allow for thermal expansion of the control rod drive when the plant is in operation. As a result, a gap exists between the flange bolts 18 and 19 and the respective ledges of the radiation shield cups 25. The gap must be sufficient to allow the control rod drive 15 to expand as the system heats up during operation, preferably about three quarters of an inch.

When the plant is in operation, the control rod drive 15 expands and the gap between the bolts 18 and 19 the cups 25 is reduced so that the flange bolts 18 and 19 cups 25 are almost touching. Preferably, the gap is reduced to about one quarter of an inch. As a result, the radiation shield cup 25 cannot move when the plant is in operation and is thereby further locked into position. When a control rod drive must be replaced or serviced, the operation of the plant is stopped and the plant cools down. As the control rod drives reduce in size, the gap between the flange bolts 18 and the radiation shield cups 25 increases to its original clearance. At such clearance the radiation shield cup 25 may be easily removed to service the control rod drive 15.

A radiation shield ring 40 is disposed about the housing of each control rod drive 15 to further reduce radiation exposure while servicing the control rod drives. The shield ring 40 is generally cylindrical in shape with an inner diameter just slightly larger than the housing of the control rod drive 15 for easy installation over the housing. The shield ring 40 includes a hanger pin 41 extending through at least one side wall thereof into the interior of the ring 40. The hanger pin 41 may be in the form of a threaded bolt, a roll pin, a hook member, or other equivalent structure.

When the control rod drive assembly is fully installed, a lower surface 42 of the shield ring 40 engages a top surface of the support tabs 28 of the shield cup 25 so that the shield ring 40 is supported on the shield cup 25. When the shield cup 25 is removed during the servicing or replacement of the control rod drive, the shield ring 40 is lowered to a position where the hanger pin 41 rests on an upper surface 15a of the housing of the control rod drive 15. In this position, the shield ring 40 is supported by the control rod drive while the flange bolts 18 and 19 of the control rod drive 15 are fully accessible from below.

The radiation shield rings also include a plurality of vertical slots 43 for accommodating seismic restraints 44. Seismic restraints 44 are typically provided on the sides of each of the control rod drives 15 to restrain movement thereof. The seismic restraints 44 may be in the form of threaded abutment members which abut against adjacent control rod drives 15 or adjacent abutment members 44 to prevent relative movement of the adjacent drives 15. With the proper adjustment, the seismic restraints 44 located throughout the array of control rod drives can effectively prevent side-to-side movement of the control rod drives after installation.

Alternatively, the hanger pins 41 can be eliminated by forming the slots 43 in an L shape so that the seismic restraints 44 support the shield ring 40 when the shield cup 25 is removed. In this arrangement, the shield ring 40 is installed by first elevating the ring into position and then rotating the ring 40 so that the seismic restraints 44 are received in the horizontal legs of the L-shaped slots.

While the radiation shield ring 40 has been described above in combination with a control rod drive support assembly having a radiation shield cup, it is not limited for use with such assemblies. As shown in FIG. 6, the radiation shield ring 40 can also be used with existing control rod drive support bar assemblies. The shield ring 40 in the embodiment of FIG. 6 can be structurally identical to the above-described embodiment of FIGS. 2 to 5. The shield ring 40 can be supported by brackets 45 fixed to the grid bars 13 when the support bar assembly is installed. Alternatively, the shield ring 40 can be supported entirely from the control rod drive housing 15, such as with hanger pins, hooks, L-shaped slots, or the like.

In the latter embodiment where the shield ring 40 is used with an existing control rod drive support assembly (FIG. 6), a substantial reduction in radiation dose rate is realized. However, an even larger reduction in radiation dose rate is realized when the shield ring 40 is combined with the improved support assembly of FIGS. 2 to 5 having the lower radiation shield cup 25.

With any of the disclosed support bar systems, the radiation shield rings 40 can be easily installed without significant additional radiation exposure. For example, the shield rings 40 can be raised and lowered by the control rod drive removal/installation machine. Thus, the present invention provides greatly increased radiation protection for persons working under the reactor vessel while also allowing quick and easy replacement of the control rod drives.

The foregoing description of the preferred embodiments of the invention has been presented for purposes of illustration and description only. The disclosed embodiments are not intended to be exhaustive or to limit the invention to the precise form disclosed. Many modifications and variations are possible in light of the above teachings. The disclosed embodiments were chosen and described in order to best explain the principles of the invention and their practical application to thereby enable others skilled in the art to best utilize the invention with various modifications as are suited to the particular use contemplated. It is intended that the scope of the invention only be limited by the claims appended hereto.

I claim:

1. A support for a control rod drive housing in a boiling water reactor, comprising:

first means for supporting a control rod drive in the case of a housing failure;

second means for supporting said control rod drive in the case of a housing failure and shielding persons working under the reactor vessel from radiation, said second means being supported by said first supporting means, and wherein said second means can be raised and lowered between a non-support position where said control rod drive is not supported and a support position where said control rod drive is supported; and a radiation shield means separate from said second support means for shielding persons working under the reactor vessel from radiation, said radiation shield means being provided about the control rod drive above said second supporting means, said radiation shield means being removable from the second support means and supported by the second support means when the second support means is in its support position.

2. A control rod drive housing support according to claim 1, wherein said first supporting means comprises a plurality of support members provided in rows on opposing sides of a lower portion of a plurality of control rod drives.

3. A control rod drive housing support according to claim 2, wherein said second supporting means comprises a plurality of support cups, each of said support cups receiving and shielding a lower portion of a respective control rod drive and supporting the respective control rod drive in the case of a housing failure.

4. A control rod drive housing support according to claim 3, wherein each of said support cups have an annular rim for supporting a respective control rod drive.

5. A control rod drive housing support according to claim 4, wherein said support cups each have first and second support tabs protruding from opposing sides thereof, said first and second support tabs being supported by said first supporting means to transfer the load of said support cups to said first supporting means.

6. A control rod drive housing support according to claim 5, wherein said support cups each have an upper support surface for supporting said radiation shield means.

7. A control rod drive housing support according to claim 3, wherein said radiation shield means comprises a plurality of shield rings, each of said shield rings being disposed about a respective control rod drive and shielding a portion of the respective control rod drive above the portion thereof shielded by a respective one of said support cups.

8. A control rod drive housing support according to claim 7, wherein said shield rings are supported by said support cups.

9. A control rod drive housing support according to claim 1, wherein said radiation shield means comprises a plurality of shield rings separate from said second supporting means, each of said shield rings being disposed about a housing of a respective control rod drive.

10. A control rod drive housing support according to claim 9, wherein said shield rings are generally cylindrical-shaped.

11. A control rod drive housing support according to claim 10, further comprising a hanger means provided on each of said shield rings for supporting the shield rings on a respective control rod drive when said second supporting means is lowered.

12. A control rod drive housing support according to claim 11, wherein said hanger means comprises a pin fixed to and extending radially inward from a side wall of each shield ring for engaging an upper surface of a respective control rod drive.

13. A control rod drive housing support according to claim 11, wherein vertical slots are formed in side walls of each of said shield rings, and further comprising seismic restraints disposed between adjacent control rod drives, said seismic restraints being received in said vertical slots.

14. A control rod drive housing support according to claim 13, wherein said vertical slots are open at an upper end thereof.

15. A control rod drive housing support according to claim 14, wherein said vertical slots comprise four vertical slots circumferentially-spaced about each of said shield rings.

16. A support for a control rod drive housing in a boiling water reactor comprising:

means for supporting a control rod drive in the case of a housing failure; and means for shielding persons working under the reactor vessel from radiation, said shielding means comprising a cylindrical-shaped shield ring disposed about said control rod drive, said shield ring being supported by said supporting means.

17. A control rod drive housing support according to claim 16, wherein said shield ring comprises a plurality of vertical slots, and further comprising seismic restraints disposed between adjacent control rod drives, said seismic restraints being received in said vertical slots.

18. A control rod drive housing support according to claim 17, wherein said vertical slots comprise four vertical slots circumferentially spaced about said shield ring.

19. A control rod drive housing support according to claim 17, wherein said shield ring has an inner diameter which is slightly larger than an outer diameter of a control rod drive housing so that said shield ring can be raised and lowered relative to the control rod drive housing.

20. A control rod drive housing support according to claim 19, further comprising a hanger means provided on said shield ring for supporting the shield ring on said control rod drive when said supporting means is removed.

21. A control rod drive housing support according to claim 20, wherein said hanger means comprises a pin fixed to and extending radially inward from a side wall of said shield ring for engaging an upper surface of the control rod drive housing.

22. A control rod drive housing support according to claim 16, wherein said supporting means comprises a support cup for receiving and shielding a lower portion of the control rod drive and for supporting the control rod drive in the case of a housing failure.

23. A control rod drive housing support according to claim 22, wherein said support cup has an upper support surface engaging and supporting said shield ring.

* * * * *